US004001759B2

United States Statutory Invention Registration [19]

[11] Reg. Number: H1759

[45] Published: Nov. 3, 1998

Theodoridis et al.

[54] HERBICIDAL BENZYLOXYPHENYL-SUBSTITUTED HETEROCYCLES

[75] Inventors: George Theodoridis, Princeton; Scott D. Crawford, Bordentown; Lester L. Maravetz, Westfield; Saroj Sehgel, Princeton Jctn, all of N.J.; Dominic Suarez, Yardley, Pa.

[73] Assignee: FMC Corporation, Philadelphia, Pa.

[21] Appl. No.: 83,289

[22] Filed: May 22, 1998

Related U.S. Application Data

[60] Provisional application No. 60/047,479 May 23, 1997.

[51] Int. Cl.[6] ..... A01N 37/00

[52] U.S. Cl. ..... 504/116

*Primary Examiner*—Charles T. Jordan
*Assistant Examiner*—Meena Chelliah

[57] ABSTRACT

It has now been found that certain novel benzyloxyphenyl-substituted heterocycles are useful as pre-emergent and post-emergent herbicides. These compounds are represented by formula I:

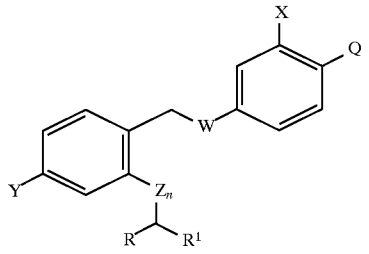

I where Q is 1-substituted-6-trifluoromethyl-2,4(1H,3H)-pyrimidinedion-3 -yl, 4-difluoromethyl-4,5-dihydro-3-methyl-1,2,4-triazol-5(1H)-on-1-yl, 4-halo-5-difluoromethoxy-1-methylpyrazol-3-yl, a 3,4,5,6-tetrahydrophthalimid-1-yl, 8-thia-1,6-diazabicyclo[4.3.0]-nonane-7-on-9-iminoyl, 4-methyl-1,2,4-triazine-3,5-dion-2-yl, 3-chloro-4,5,6,7-tetrahydroindazol-2-yl, 1,4-dihydro-4-(3-fluoropropyl)-5H-tetrazole-5-on-1-yl or a 5,6,7,8-tetrahydro-1,2,4-triazolo-[4,3-a]pyridin-3(2H)-on-2-yl moiety; Z is oxygen, sulfur or $CH_2$; n is 0 or 1, and W, X, Y, R, and $R^1$ are as described in the specification. Preferred are those compounds where W is oxygen; X is hydrogen or fluoro; Y is methyl or ethyl; n is 1; Z is oxygen; R is methyl; and $R^1$ is hydroxyalkyl or $CH_2OCONHCH_3$.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HERBICIDAL BENZYLOXYPHENYL-SUBSTITUTED HETEROCYCLES

This is a provisional application Ser. No. 60/047,479 filed May 23, 1997.

BACKGROUND OF THE INVENTION

This invention relates generally to novel herbicidal compounds and methods for their use in controlling unwanted plant species in agriculture. In particular, it pertains to herbicidal benzyloxyphenyl-substituted heterocycles, and more particularly it pertains to herbicidal benzyloxyphenyl-substituted heterocycles where the benzyl ring has attached to it a substituted alkyl or alkoxy group and the heterocycle is a 1-substituted-6-trifluoromethyl-2,4(1H,3H)-pyrimidinedion-3-yl, a 4-difluoromethyl-4,5-dihydro-3-methyl-1,2,4-triazol-5(1H)-on-1-yl, a 4-halo-5-difluoromethoxy-1-methylpyrazol-3-yl, a 3,4,5,6-tetrahydrophthalim1d-1-yl, a 8-thia-1,6-diazabicyclo[4.3.0]-nonane-7-on-9-iminoyl, a 4-methyl-1,2,4-triazine-3,5-dion-2-yl, a 3-chloro-4,5,6,7-tetrahydroindazol-2-yl, a 1,4-dihydro-4-(3-fluoropropyl)-5H-tetrazole-5-on-1-yl, or a 5,6,7,8-tetrahydro-1,2,4-triazolo-[4,3-a]pyridin-3(2ZH)-on-2-yl moiety.

There is a continuing demand for new herbicides. Herbicides are useful for controlling unwanted vegetation which may otherwise cause significant damage to crops such as wheat, corn, soybeans and cotton, to name a few. For crop protection, so-called "selective" herbicides are desired which can control the weeds without damaging the crop. Such crops are said to exhibit tolerance to the herbicide. In certain other situations, it is desirable to use herbicides that provide complete vegetation control such as in areas around railroad tracks and other structures. While many commercial products are available that provide selective or complete vegetation control, the demand exists for new, safe herbicides that are more effective and less costly.

U.S. Pat. Nos. 5,262,390 and 5,344,812 (both to FMC) describe certain herbicidal benzyloxyphenyl-substituted heterocycles of the following formula:

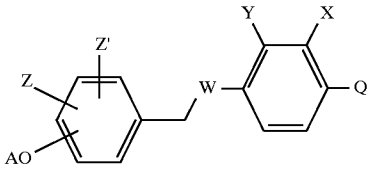

in which A is an alkanoate group or derivative bonded to the phenoxy oxygen at the alpha carbon of the alkanoate, W is oxygen or sulfur, Q is a heterocycle, and Y, X, Z and Z' are selected from various substituents. The scope of these herbicides is limited to those compounds having the AO group attached to the benzyl ring.

SUMMARY OF THE INVENTION

It has now been found that certain novel benzyloxyphenyl-substituted heterocycles are useful as pre-emergent and post-emergent herbicides. These compounds are represented by formula I:

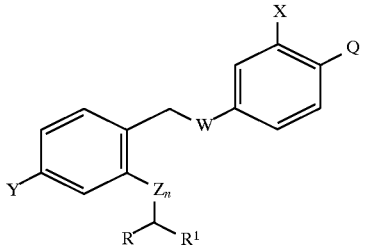

I where Q is 1-substituted-6-trifluoromethyl-2,4(1H,3H)-pyrimidinedion-3-yl, 4-difluoromethyl-4,5-dihydro-3-methyl-1,2,4-triazol-5(1H)-on-1-yl, 4-halo-5-difluoromethoxy-1-methylpyrazol-3-yl, a 3,4,5,6-tetrahydrophthalimid-1-yl, 8-thia-1,6-diazabicyclo[4.3.01-nonane-7-on-9-iminoyl, 4-methyl-1,2,4-triazine-3,5-dion-2-yl, 3-chloro-4,5,6,7-tetrahydroindazol-2-yl, 1,4-dihydro-4-(3-fluoropropyl)-5H-tetrazole-5-on-1-yl, or 5,6,7,8-tetrahydro-1,2,4-triazolo-[4,3-a]pyridin-3(2H)-on-2-yl; Z is oxygen, sulfur or $CH_2$; n is 0 or 1, and W, X, Y, R, and $R^1$ are as described below. Preferred are those compounds where W is oxygen; X is hydrogen or fluoro; Y is methyl or ethyl; n is 1; Z is oxygen; R is methyl; and $R^1$ is hydroxyalkyl or $CH_2OCONHCH_3$.

DETAILED DESCRIPTION OF THE INVENTION

Certain novel benzyloxyphenyl-substituted heterocycles are useful as pre-emergent and post-emergent herbicides. These compounds are represented by formula I:

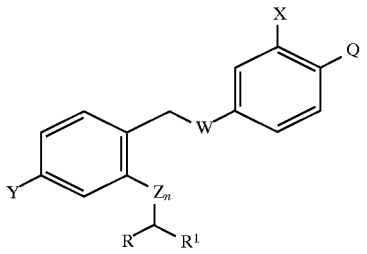

I where

Q is

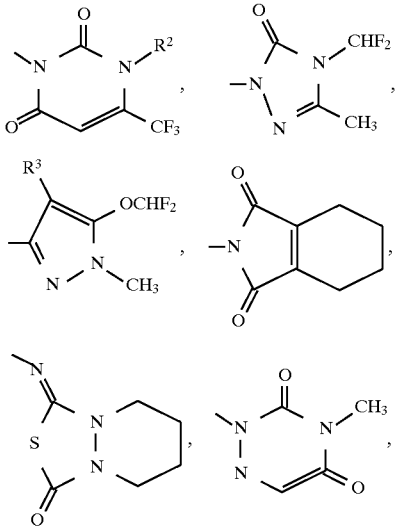

-continued

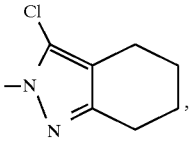

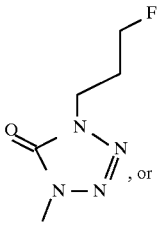

, or

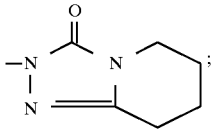

;

W is oxygen or sulfur;

X is hydrogen, halogen, or lower alkyl;

Y is hydrogen, halogen, straight or branched chain lower alkyl, haloalkyl, alkoxy, alkenyl, phenyl, or phenoxy;

n is 0 or 1;

Z is oxygen, sulfur, or $CH_2$;

R is hydrogen, halogen, or lower alkyl;

$R^1$ is cyano, hydroxyalkyl, alkoxyalkyl, dialkoxyalkyl, trialkylsilyloxyalkyl, formyl, carboxyl, alkylcarbonyl, alkoxycarbonyl, aminocarbonyl, alkylaminocarbonyl, alkylcarbonyloxyalkyl, alkoxycarbonyloxyalkyl, alkylcarbonylaminoalky, alkoxycarbonylaminoalkyl, alkylsulfonylaminoalkyl, alkylaminocarbonyloxyalkyl, arylaminocarbonyloxyalkyl, alkoxyiminoalkyl, epoxy, 1,3-dioxan-4-yl, or 2,2-dialkyl-1,3-dioxolan-4-yl;

$R^2$ is hydrogen, amino, straight or branched chain alkyl, haloalkyl, cyanoalkyl, alkoxyalkyl, arylalkyl, alkoxycarbonylalkyl, alkenyl, alkynyl, or sodium salt; and $R^3$ is halogen; with the proviso that when Z is oxygen and n is 1, $R^1$ is other than alkoxycarbonyl, aminocarbonyl, or alkylcarbonyl.

For Q in formula I, the above structural moieties may also be identified by their chemical names as follows:

A

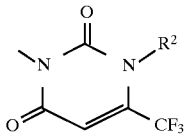

B

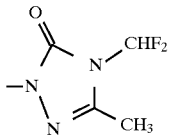

C

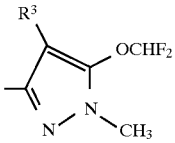

-continued

D

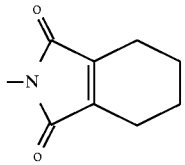

E

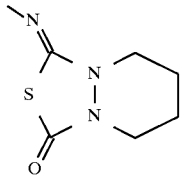

F

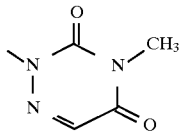

G

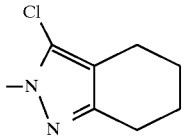

H

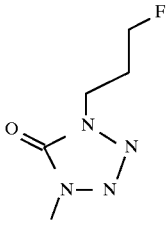

I

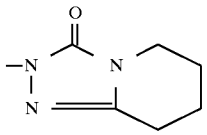

where "A" is 1-substituted-6-trifluoromethyl-2,4(1H,3H)-pyrimidinedion-3-yl, "B" is 4-difluoromethyl-4,5-dihydro-3-methyl-1,2,4-triazol-5(1H)-on-1-yl, "C" is 4-halo-5-difluoromethoxy-1-methylpyrazol-3-yl, "D" is 3,4,5,6-tetrahydrophthalimid-1-yl, "E" is 8-thia-1,6-diazabicyclo[4.3.0]-nonane-7-on-9-iminoyl, "F" is 4-methyl-1,2,4-triazine-3,5-dion-2-yl, "G" is 3-chloro-4,5,6,7-tetrahydroindazol-2-yl, "H" is 1,4-dihydro-4-(3-fluoropropyl)-5H-tetrazole-5-on-1-yl, and "J" is 5,6,7,8-tetrahydro-1,2,4-triazolo-[4,3-a]pyridin-3(2H)-on-2-yl.

One aspect of this invention relates to compounds of formula I where Q is 1-substituted-6-trifluoromethyl-2,4(1H,3H)-pyrimidinedion-3-yl and W, X, Y, Z, n, R, $R^1$ and $R^2$ are as described above.

Another aspect of this invention relates to compounds of formula I where Q is 4-difluoromethyl-4,5-dihydro-3-methyl-1,2,4-triazol-5(1H)-on-1-yl and W, X, Y, Z, n, R, and $R^1$ are as described above.

Another aspect of this invention relates to compounds of formula I where Q is 4-halo-5-difluoromethoxy-1-methylpyrazol-3-yl and W, X, Y, Z, n, R, $R^1$ and $R^3$ are as described above.

Another aspect of this invention relates to compounds of formula I where Q is 3,4,5,6-tetrahydrophthalimid-1-yl and W, X, Y, Z, n, R, and $R^1$ are as described above.

Another aspect of this invention relates to compounds of formula I where Q is 8-thia-1,6-diazabicyclo[4.3.0]-nonane-7-on-9-iminoyl, and W, X, Y, Z, n, R, and $R^1$ are as described above.

Another aspect of this invention relates to compounds of formula I where Q is 4-methyl-1,2,4-triazine-3,5-dion-2-yl and W, X, Y, Z, n, R, and $R^1$ are as described above.

Another aspect of this invention relates to compounds of formula I where Q is 3-chloro-4,5,6,7-tetrahydroindazol-2-yl, and W, X, Y, Z, n, R, and $R^1$ are as described above.

Another aspect of this invention relates to compounds of formula I where Q is 1,4-dihydro-4-(3-fluoropropyl)-5H-tetrazole-5-on-1-yl, and W, X, Y, Z, n, R, and $R^1$ are as described above.

Another aspect of this invention relates to compounds of formula I where Q is 5,6,7,8-tetrahydro-1,2,4-triazolo-[4,3-a]pyridin-3(2H)-on-2-yl, and W, X, Y, Z, n, R, and $R^1$ are as described above.

Preferred compounds are those of formula I where W is oxygen; X is hydrogen or fluoro; Y is methyl or ethyl; n is 1; Z is oxygen; R is methyl; and $R^1$ is hydroxyalkyl or $CH_2OCONHCH3$.

Particularly preferred are those compounds of formula I where Q is 1-substituted-6-trifluoromethyl-2,4(1H,3H)-pyrimidinedion-3-yl; W is oxygen; X is hydrogen or fluoro; Y is methyl or ethyl; n is 1; Z is oxygen; R is methyl; $R^1$ is $CH_2OH$,$C(CH_3)_2OH$, or $CH_2OCONHCH_3$; and $R^2$ is methyl or amino.

Certain intermediates of the present invention are novel. These include compounds of formula II:

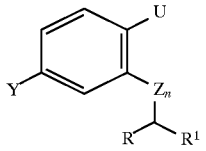

II where

Y and R are as described above;

U is formyl or $CH_2$-T;

T is chloro, bromo, hydroxy, or 1,1-dimethylethyldimethylsilyloxy;

n is 1;

Z is oxygen; and, $R^1$ is cyano, hydroxyalkyl, alkoxyalkyl, alkoxyalkoxyalkyl, alkoxycarbonyl, 1,1-dimethylethyldimethylsilyloxyalkyl, 2,2-dimethyl-1,3-dioxolan-4-yl, or 1,3-dioxan-4-yl;

with the proviso that when Y is methyl, U is formyl, and R is hydrogen, $R^1$ is other than alkoxyalkyl.

As used in this specification and unless otherwise indicated the terms "alkyl", "alkenyl", "haloalkyl", and "alkoxy" used alone or as part of a larger moiety includes 1 to 6 carbon atoms. "Halogen" refers to fluorine, bromine, or chlorine. The terms "DMF" refers to N,N'-dimethylformamide and "THF" refers to tetrahydrofuran.

The benzyloxyphenyl-substituted heterocyles of formula I are prepared by methods similar to those known to one skilled in the art.

Scheme 1

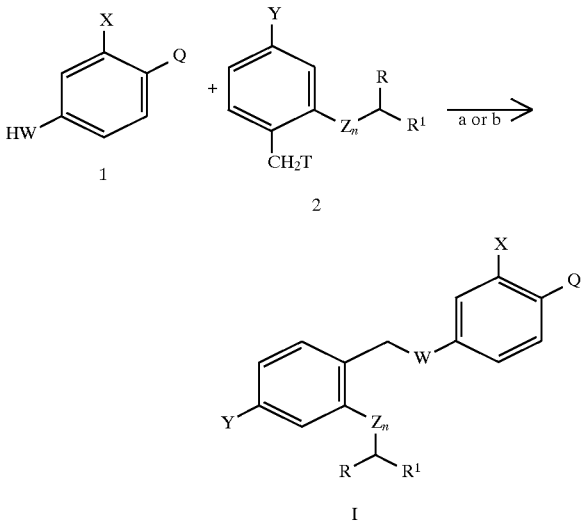

I (a) when T is Cl or Br: $K_2CO_3$, DMF (b) when T is OH: diethyldiazodicarboxylate, $Ph_3P$, THF, 0–10° C.

Scheme 1 above illustrates a general procedure for preparing compounds of formula I where n is 1, and Z and W are oxygen. A heterocyclic-substituted phenol 1 may be coupled with either an appropriately substituted alkyl halide 2 (T is chlorine or bromine) according to step (a) or with an alkyl alcohol 2 (T is OH) according to step (b). The preparation of the phenols 1 are taught in U.S. Pat. Nos. 5,262,390, 5,344,812 and 5,032,165 which are incorporated herein by reference.

Scheme 2

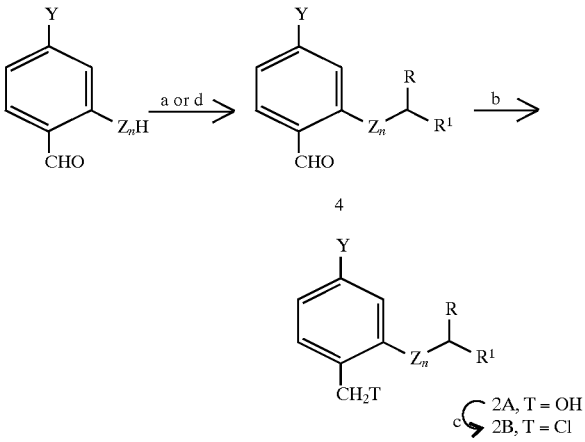

(a) $K_2CO_3$, $RR^1CHBr$, THF; (b) $NaBH_4$, $NaOCH_3$, $CH_3OH$, 0–10° C; (c) $SOCl_2$, $CH_2Cl_2$, pyridine; (d) $K_2CO_3$, $RR^1CHOSAO_2CH_3$, DMF Scheme 2 above shows a preparation of the benzyl alcohol and benzyl halide intermediates 2a and 2b, respectively. A salicaldehyde 3 (Z is oxygen, n is 1) may be alkylated with a substituted alkyl bromide according to step (a) to provide the intermediate benzaldehyde 4. Alternatively, 3 may be alkylated with an alkyl mesylate ($RR^1CHOSO_2C_3$) rather than an alkyl bromide using potassium carbonate in DMF according to step (d). The mesylate, for example, was used in reactions where R is H and $R^1$ is a 2,2-dimethyl-1,3-dioxolan-4-yl or 1,3-dioxan-4-yl group. The benzaldehyde 4 may be reduced to the alcohol 2a (T is OH) according to step (b). Other methods for reducing 4 may be used depending on the nature of the $R^1$ group. For example, when $R^1$ is CN, $CH_2OCH_3$, 2,2-dirnethyl-1,3-dioxolan-4-yl or 1,3-dioxan4-yl, 4 may be reduced to the alcohol using 5% or 10% palladium on carbon. Alternatively, if $R^1$ is $CH_2OSi(CH_3)_2C(CH_3)_3$, 4 may be reduced using borane in THF at −30° to −40° C. Converting the T group in intermediate 2a from hydroxyl to chlorine 2b is achieved according to step (c). Alternatively, the T group in 2a may be converted from hydroxyl to bromine using $CBr_4$ and $Ph_3P$ in methylene chloride at 0° to 10° C.

Scheme 3

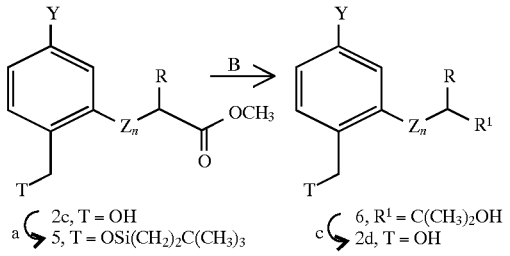

a) t-butyldimethylsilychloride, imidazole, DMF; (b) $CH_3MgBr$; (c) $Bu_4NF$, THF Certain of the compounds of this invention may be obtained through the use of common intermediates. An example of such a common intermediate is 2c in Scheme 3 above. Compounds of formula I where $R^1$ is $CO_2CH_3$ may be obtained directly via 2c following the general route outlined in Scheme 1 or, as exemplified in Scheme 3, 2c may be first converted to other intermediates such as 2d which may used to obtain other compounds of formula I.

Compounds of the present invention are prepared in accordance with the procedures shown in the Examples below, by procedures analogous to those shown in the Examples, or by other methods that are generally known or available to one skilled in the art.

EXAMPLE 1

1-METHYL-6-TRIFLUOROMETHYL-3-[4-[4ETHYL-2-(1,3-DIOXAN-4-YLMETHOXY) PHENYLMETHOXY]PHENYL]-2,4(1H,3H)-PYRIMIDINEDIONE (COMPOUND 129)

Step (a) Synthesis of 4-methylsulfonyloxymethyl-1,3-dioxane

A stirred solution of 16.2 grams (0.137 mole) of 1,3-dioxan-4-ylmethanol and 16.7 grams (0.165 mole) of triethylamine in 250 mL of methylene chloride was cooled to about −20° C., and a solution of 17.3 grams (0.151 mole) of methanesulfonyl chloride in about 25 mL of methylene chloride was added dropwise. Upon completion of addition the reaction mixture was allowed to warm to ambient temperature as it stirred for one hour. The reaction mixture was then washed with water and dried with magnesium sulfate. The mixture was filtered and concentrated under reduced pressure to a residue. The residue was purified using column chromatography on silica gel, yielding 18.1 grams of the subject compound. The NMR spectrum was consistent with the proposed structure.

Step (b) Synthesis of 4-ethyl-2-(1,3-dioxan-4-ylmethoxy) benzaldehyde

A stirred solution of 3.8 grams (0.026 mole) of 5-ethyl-2-formylphenol, 5.0 grams (0.026 mole) of 4-methylsulfonyloxymethyl-1,3-dioxane, and 7.0 grams (0.051 mole) of potassium carbonate in 150 mL of N,N-dimethylformamide was heated at 80° C. for about 18 hours. Analysis by thin layer chromatography (TLC) indicated the reaction was not complete. An additional 2.5 grams (0.013 mole) of 4-methylsulfonyloxymethyl-1,3-dioxane was added, and the reaction mixture was heated at 80° C. for an additional five hours. After this time the reaction mixture was poured into water and extracted with ethyl acetate. The extract was washed with aqueous 10% lithium chloride, dried with magnesium sulfate, and filtered. The filtrate was concentrated under reduced pressure to a residue. The residue was purified by column chromatography on silica gel, yielding 3.6 grams of the subject compound. The NMR spectrum was consistent with the proposed structure.

Step (c) Synthesis of 4-ethyl-2-(1,3-dioxan-4-ylmethoxy) phenylmethanol

Using a Parr hydrogenator, 3.4 grams (0.014 mole) of 4-ethyl-2-(1,3-dioxan-4-ylmethoxy)benzaldehyde in 200 mL of ethanol was hydrogenated in the presence of 5% palladium on carbon for two hours at 50 psi. The yield of subject compound was 2.3 grams, following purification by column chromatography on silica gel. The NMR spectrum was consistent with the proposed structure.

Step (d) Synthesis of 4-ethyl-2-(1,3-dioxan-4-ylmethoxy) phenylmethylchloride

A solution of 0.5 mL (0.007 mole) of thionyl chloride and a catalytic amount of pyridine in about 80 mL of methylene chloride was stirred, and a solution of 1.6 grams (0.006 mole) of 4-ethyl-2-(1,3-dioxan-4-ylmethoxy) phenylmethanol in about 20 mL of methylene chloride was added dropwise. Upon completion of addition the reaction mixture stirred at ambient temperature for about 18 hours. The reaction mixture was then washed with water, dried with magnesium sulfate, and filtered. The filtrate was concentrated under reduced pressure to a residue. The residue was purified by column chromatography on silica gel, yielding 2.2 grams of the subject compound. The NMR spectrum was consistent with the proposed structure.

Step (e) Compound 129

This compound was prepared in the manner of Step (b) of the present Example, using 0.8 gram (0.003 mole) of 1-methyl-3-(4-hydroxyphenyl)-6-trifluoromethyl-2,4(1H, 3H)-pyrimidinedione, 0.7 gram (0.003 mole) of 4-ethyl-2-(1,3-dioxan-4-ylmethoxy)phenylmethyl chloride, and 0.7 gram (0.005 mole) of potassium carbonate in 60 mL of DMF. The yield of Compound 129 was 1.1 grams (mp 118°–121° C.), following purification by column chromatography on silica gel. The NMR spectrum was consistent with the proposed structure.

EXAMPLE 2

1-METHYL-6-TRIFLUOROMETHYL-3-[4-[4-ETHYL-2-[2-(1,1-DIMETHYL-ETHYL) DIMETHYLSILYLOXY)ETHOXY] PHENYLMETHOXY]PHENYL]-2,4(1H,3H)-PYRIMIDINEDIONE (COMPOUND 133)

Step (a) Synthesis of 4-ethyl-2-[2-(1,1-dimethylethyldimethylsilyloxy)-ethoxy]benzaldehyde This compound was prepared in a manner analogous to that of Step (*b*) of Example 1, using 17.0 grams (0.113 mole) of 5-ethyl-2-formylphenol, 27.7 grams (0.116 mole) of 2-(1,1-dimethylethyldimethylsilyloxy)ethyl bromide, 19.2 grams (0.139 mole) of potassium carbonate, and a catalytic amount of 18-crown-6 in 200 mL of THF. The yield of the subject compound was 12.7 grams, following purification by column chromatography on silica gel. The NMR spectrum was consistent with the proposed structure.

Step (b) Synthesis of 4-ethyl-2-[2-(1,1-dimethylethyldimethylsilyloxy)-ethoxy]phenylmethanol A stirred solution of 12.2 grams (0.039 mole) of 4-ethyl-2-[2-(1,1-dimethylethyldimethylsilyloxy)ethoxy]benzaldehyde in 100 mL of tetrahydrofuran was cooled to −30° C., and 20 mL (0.020 mole) of borane—tetrahydrofuran complex was added dropwise. Upon completion of addition the reaction mixture was stirred for one hour, then poured into water. The mixture was extracted with three 100 mL portions of ethyl acetate. The combined extracts were dried with magnesium sulfate and filtered. The filtrate was concentrated under reduced pressure to a residue. The residue was purified by column chromatography on silica gel, yielding 11.2 grams of the subject compound. The NMR spectrum was consistent with the proposed structure.

Step (c) Compound 133

A solution of 2.8 grams (0.010 mole) of 1-methyl-3-(4-hydroxyphenyl)-6-trifluoromethyl-2,4(1H,3H)-pyrimidinedione, 3.0 grams (0.010 mole) of 4-ethyl-2-[2-(1,1-dimethylethyldimethylsilyloxy)ethoxy]phenylmethanol, 2.4 mL (0.015 mole) of diethylazodicarboxylate, and 3.9 grams (0.015 mole) of triphenylphosphine in 20 mL of THF was stirred at 0°–10° C. for about 18 hours. After this time the reaction mixture was poured into water and extracted with three 70 mL portions of ethyl acetate. The combined extracts were dried with magnesium sulfate and filtered. The filtrate was concentrated under reduced pressure to a residue. The residue was purified by column chromatography on silica gel, yielding 3.9 grams of Compound 133. The NMR spectrum was consistent with the proposed structure.

EXAMPLE 3

2-[5-ETHYL-2-[4-[1-METHYL-6-TRIFLUOROMETHYL-2,4(1H,3H)-PYRIMIDINEDION-3-YL]PHENOXYMETHYL]PHENOXY]ETHANOL (COMPOUND 71)

A solution of 0.8 gram (0.0013 mole) of Compound 133 in 8 mL of acetic acid and 2 mL of water was stirred for one hour. After this time the reaction mixture was concentrated under reduced pressure to a residue. The residue was dissolved in water and extracted with three 40 mL portions of methylene chloride. The combined extracts were dried with magnesium sulfate, filtered, and concentrated under reduced pressure to a residue. The residue was dried under high vacuum, yielding 0.6 gram of Compound 71. The NMR spectrum was consistent with the proposed structure.

EXAMPLE 4

2-[5-ETHYL-2-[4-[1-METHYL-6-TRIFLUOROMETHYL-2,4(1H,3H)-PYRIMIDINEDION-3-YL]PHENOXYMETHYL]PHENOXY]ETHYLMETHYLCARBAMATE (COMPOUND 147)

A solution of 1.0 gram (0.002 mole) of Compound 71 in 3.0 mL of methylene chloride was stirred, and 0.2 gram (0.003 mole) of methyl isocyanate was added, followed by a catalytic amount of 4-dimethylaminopyridine (DMAP). Upon completion of addition, the reaction mixture was stirred at ambient temperature for about 18 hours. TLC analysis of the reaction mixture indicated that the proposed reaction had not taken place. The mixture was concentrated under reduced pressure to a residue. One mL of methyl isocyanate was added to the residue, and the mixture stirred with a spatula. The resultant solid was purified by column chromatography on silica gel, yielding 0.8 gram of Compound 147, mp 148–52° C. The NMR spectrum was consistent with the proposed structure.

EXAMPLE 5

2-METHYL-3-[5-ETHYL-2-[3-FLUORO-4-[4-DIFLUOROMETHYL-4,5-DIHYDRO-3-METHYL-1,2,4-TRIAZOL-5(1H)-ON-1-YL]PHENOXYMETHYL]PHENOXY]PROPAN-2-OL (COMPOUND 137)

Step (a) ethyl (5-ethyl-2-formylphenoxy)acetate as an intermediate

This compound was prepared in the manner of Step (a) of Example 2, using 30 grams (0.20 mole) of 5-ethyl-2-formylphenol, 36.7 grams (0.22 mole) of ethyl bromoacetate, 33.2 grams (0.24 mole) of potassium carbonate, and a catalytic amount of 18-crown-6 in 250 mL of THF. The yield of the subject compound was 42.4 grams, following purification by column chromatography on silica gel. The NMR spectrum was consistent with the proposed structure.

Step (b) ethyl (5-ethyl-2-hydroxymethylphenoxy)acetate

This compound was prepared in the manner of Step (b) of Example 2, using 41.8 grams (0.177 mole) of ethyl (5-ethyl-2-formylphenoxy)acetate, and 8.3 grams (0.097 mole) of borane-tetrahydrofuran complex in 200 mL of THF. The yield of the subject compound was 38.1 grams, following purification by column chromatography on silica gel. The NMR spectrum was consistent with the proposed structure.

Step (c) ethyl [5-ethyl-2-(1,1-dimethylethyldimethylsilyloxymethyl)phenoxy]acetate A solution of 37.6 grams (0.159 mole) of ethyl (5-ethyl-2-hydroxymethyl-phenoxy)acetate, 28.8 grams (0.191 mole) of 1,1-dimethylethyldimethylsilyl chloride, and 13.0 grams (0.191 mole) of imidazole in 300 mL of methylene chloride was stirred at ambient temperature for about 18 hours. After this time the reaction mixture was poured into water. The mixture was extracted with three 120 mL portions of methylene chloride. The combined extracts were dried with magnesium sulfate, filtered, and concentrated under reduced pressure to a residue. The residue was purified by column chromatography on silica gel, yielding 53.6 grams of the subject compound. The NMR spectrum was consistent with the proposed structure.

Step (d) 2-methyl-3-[5-ethyl-2-(1,1-dimethylethyldimethylsilyloxymethyl)phenoxy]propan-2-ol A stirred solution of 19 mL (0.057 mole) of methylmagnesium chloride (3.0M in THF) in about 30 mL of THF was cooled to 0° C., and a solution of 5.0 grams (0.014 mole) of ethyl [5-ethyl-2-(1,1-dimethylethyl-dimethylsilyloxymethyl)phenoxy]acetate in about 15 mL of THF was added dropwise. Upon completion of addition, the reaction mixture was stirred at 0° C. for one hour, then it was allowed to warm to ambient temperature. The reaction mixture was poured into water, and solid ammonium chloride was added until phase separation occured. The mixture was then extracted with three 80 mL portions of diethyl ether. The combined extracts were dried with magnesium sulfate, filtered, and concentrated under reduced pressure to a residue. The residue was dried under high vacuum, yielding 4.8 grams of the subject compound. The NMR spectrum was consistent with the proposed structure.

Step (e) 4-ethyl-2-(2-hydroxy-2-methylpropoxy) phenylmethanol

A solution of 4.3 grams (0.013 mole) of 2-methyl-3-[5-ethyl-2-(1,1-dimethylethyldimethylsilyloxymethyl) phenoxy]propan-2-ol in 25 mL of tetrahydrofuran was stirred, and 3.7 grams (0.014 mole) of tetrabutylammonium fluoride (1.0M in tetrahydrofuran) was added portionwise. Upon completion of addition, the reaction mixture was stirred at ambient temperature for five hours. After this time the reaction mixture was poured into water containing a small amount of ammonium chloride. The mixture was extracted with three 70 mL portions of ethyl acetate. The combined extracts were dried with magnesium sulfate, filtered, and concentrated under reduced pressure to a residue. The residue was purified by column chromatography on silica gel, yielding 2.7 grams of the subject compound. The NMR spectrum was consistent with the proposed structure.

Step (f) Compound 137

This compound was prepared in the manner of Step (c) of Example 2, using 2.0 grams (0.008 mole) of 4-difluoromethyl-4,5-dihydro-3-methyl-1-(2-fluoro-4-hydroxyphenyl)-1,2,4-triazol-5(1H)-one, 1.9 mL (0.012 mole) of diethylazodicarboxylate, and 3.0 grams (0.012 mole) of triphenylphosphine in about 20 mL of THF. The yield of Compound 137 was 1.0 gram, following purification by column chromatography on silica gel. The NMR spectrum was consistent with the proposed structure.

EXAMPLE 6

2-METHYL-3-[5-ETHYL-2-[3-FLUORO-4-[4-DIFLUOROMETHYL-4,5-DIHYDRO-3-METHYL-1,2,4-TRIAZOL-5(1H)-ON-1-YL] PHENOXYMETHYL]PHENOXY]PROPAN-2-YL ACETATE (COMPOUND 138)

A solution of 0.40 gram (0.0009 mole) of Compound 137,0.18 gram (0.0017 mole) of acetic anhydride, and 0.21 gram (0.0017 mole) of DMAP in 10 mL of methylene chloride was stirred at ambient temperature for about 18 hours. The reaction mixture was poured into water, and the mixture was extracted with three portions of 50 mL each of methylene chloride. The combined extracts were dried with magnesium sulfate, filtered, and concentrated under reduced pressure to a residue. The residue was purified by column chromatography on silica gel, yielding 0.43 gram of Compound 138. The NMR spectrum was consistent with the proposed structure.

EXAMPLE 7

1-METHYL-6-TRIFLUOROMETHYL-3-[4-[4-ETHYL-2-(2-METHOXYETHOXY) PHENYLMETHOXY]PHENYL]-2,4(1H,3H) PYRIMIDINEDIONE (COMPOUND 73)

Step (a) 4-ethyl-2-(2-methoxyethoxy)phenylmethanol

This compound was hydrogenated in the manner of Step (c) of Example 1, using 7.5 grams (0.036 mole) of 4-ethyl-2-(2-methoxyethoxy)benzaldehyde in 200 mL of ethanol in the presence of 10% palladium on carbon. The yield of the subject compound was 1.8 grams, following purification by column chromatography on silica gel. The NMR spectrum was consistent with the proposed structure.

Step (b) 4-ethyl-2-(2-methoxyethoxy)phenylmethyl bromide

A stirred solution of 1.6 grams (0.007 mole) of 4-ethyl-2-(2-methoxyethoxy)phenylmethanol and 3.1 grams (0.009 mole) of carbon tetrabromide in 20 mL of methylene chloride was cooled to 0° C., and 2.9 grams (0.011 mole) of triphenyl phosphine was added portionwise. Upon completion of addition the reaction mixture stirred for 15 minutes, then concentrated under reduced pressure to a residue. The residue was stirred with diethyl ether and filtered. The filter cake was slurried with diethyl ether and collected by filtration. The slurrying with diethyl ether was repeated. The combined ether extracts were concentrated under reduced pressure to a residue. The residue was purified by column chromatography on silica gel, yielding 1.8 grams of the subject compound. The NMR spectrum was consistent with the proposed structure.

Step (c) Compound 73

This compound was prepared in the manner of Step (b) of Example 1, using 1.0 gram (0.004 mole) of 4-ethyl-2-(2-methoxyethoxy)phenylmethyl bromide, 1.4 grams (0.005 mole) of 1-methyl-3-(4-hydroxyphenyl)-6-trifluoromethyl-2,4(1H,3H)-pyrimidinedione, and 0.7 gram (0.005 mole) of potassium carbonate in 20 mL of DMF. The yield of Compound 73 was 0.4 gram, following purification by column chromatography on silica gel. The NMR spectrum was consistent with the proposed structure.

Representative compounds of this invention are listed in Table 1.

TABLE 1

Herbicidal Benzyloxyphenyl-substituted Heterocycles

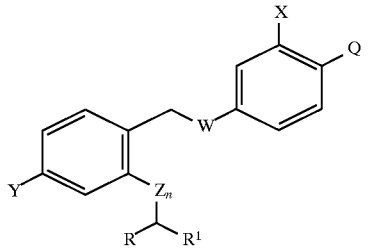

I where W is oxygen; Q is one of the following moieties:

TABLE 1-continued

Herbicidal Benzyloxyphenyl-substituted Heterocycles

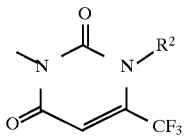

A

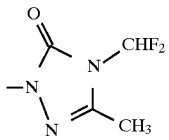

B

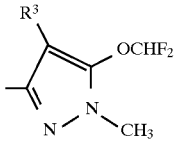

C

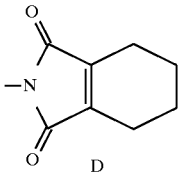

D

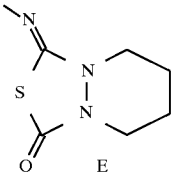

E

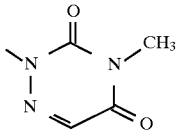

F

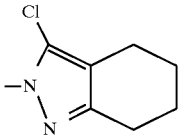

G

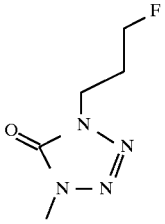

H

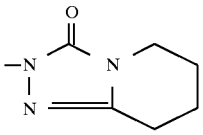

J

| Cmpd No. | X | Y | n | Z | R | $R^1$ | Q | $R^2$ or $R^3$ |
|---|---|---|---|---|---|---|---|---|
| 1 | H | $C_2H_5$ | 1 | O | $CH_3$ | $C(CH_3)_2OH$ | A | $CH_3$ |
| 2 | H | $C_2H_5$ | 1 | O | $CH_3$ | $C(CH_3)_2OH$ | C | Br |
| 3 | F | $C_2H_5$ | 1 | O | $CH_3$ | $C(CH_3)_2OH$ | C | Cl |
| 4 | F | $C_2H_5$ | 1 | O | $CH_3$ | $C(CH_3)_2OH$ | B | — |
| 5 | F | $C_2H_5$ | 1 | O | $CH_3$ | $C(CH_3)_2OH$ | A | $CH_3$ |
| 6 | F | $C_2H_5$ | 1 | O | H | $C(CH_3)_2OH$ | A | $CH_3$ |
| 7 | H | H | 1 | $CH_2$ | H | $CO_2CH_3$ | C | Cl |
| 8 | H | Cl | 1 | $CH_2$ | H | $CO_2CH_3$ | C | Cl |
| 9 | H | $CH_3$ | 1 | CH | H | $CO_2CH_3$ | C | Cl |
| 10 | F | Cl | 1 | CH | $CH_3$ | $CO_2CH_3$ | C | Cl |
| 11 | H | Cl | 1 | CH | Cl | $CO_2CH_3$ | C | Cl |
| 12 | H | $C_2H_5$ | 1 | $CH_2$ | H | $CO_2CH_3$ | C | Cl |
| 13 | F | $C_2H_5$ | 1 | $CH_2$ | Cl | $CO_2CH_3$ | C | Cl |
| 14 | F | $C_2H_5$ | 1 | $CH_2$ | Cl | $CO_2H$ | C | Cl |
| 15 | F | Cl | 1 | $CH_2$ | Cl | $CONH_2$ | C | Cl |
| 16 | F | $CH_3$ | 1 | $CH_2$ | Cl | $CONHCH_3$ | C | Cl |
| 17 | F | $CH_3$ | 1 | $CH_2$ | Cl | $COCH_3$ | C | Cl |
| 18 | F | H | 1 | $CH_2$ | Cl | $CO_2CH_3$ | C | Cl |
| 19 | H | $C_2H_5$ | 0 | — | $CH_3$ | $C\equiv N$ | C | Cl |
| 20 | H | $C_2H_5$ | 0 | — | H | $C\equiv N$ | C | Cl |
| 21 | F | Cl | 0 | — | $CH_3$ | $C\equiv N$ | C | Cl |
| 22 | F | $CH_3$ | 0 | — | $CH_3$ | $C\equiv N$ | C | Cl |
| 23 | F | F | 0 | — | $CH_3$ | $C\equiv N$ | C | Cl |
| 24 | F | $C_2H_5$ | 0 | — | $CH_3$ | $C\equiv N$ | C | Cl |
| 25 | Cl | $C_2H_5$ | 1 | O | $CH_3$ | $C(CH_3)_2OH$ | A | $CH_3$ |
| 26 | Br | $C_2H_5$ | 1 | O | $CH_3$ | $C(CH_3)_2OH$ | A | $CH_3$ |
| 27 | $CH_3$ | $C_2H_5$ | 1 | O | $CH_3$ | $C(CH_3)_2OH$ | A | $CH_3$ |
| 28 | H | H | 1 | O | $CH_3$ | $C(CH_3)_2OH$ | A | $CH_3$ |
| 29 | H | $CH_3$ | 1 | O | $CH_3$ | $C(CH_3)_2OH$ | A | $CH_3$ |
| 30 | H | Cl | 1 | O | $CH_3$ | $C(CH_3)_2OH$ | A | $CH_3$ |
| 31 | H | F | 1 | O | $CH_3$ | $C(CH_3)_2OH$ | A | $CH_3$ |
| 32 | H | $OCH_3$ | 1 | O | $CH_3$ | $C(CH_3)_2OH$ | A | $CH_3$ |

TABLE 1-continued

Herbicidal Benzyloxyphenyl-substituted Heterocycles

| | | | | | | | | |
|---|---|---|---|---|---|---|---|---|
| 33 | H | $OC_6H_5$ | 1 | O | $CH_3$ | $C(CH_3)_2OH$ | A | $CH_3$ |
| 34 | H | Br | 1 | O | $CH_3$ | $C(CH_3)_2OH$ | A | $CH_3$ |
| 35 | H | $tC_4H_9$ | 1 | O | $CH_3$ | $C(CH_3)_2OH$ | A | $CH_3$ |
| 36 | H | $nC_3H_7$ | 1 | O | $CH_3$ | $C(CH_3)_2OH$ | A | $CH_3$ |
| 37 | H | $iC_3H_7$ | 1 | O | $CH_3$ | $C(CH_3)_2OH$ | A | $CH_3$ |
| 38 | H | $nC_4H_9$ | 1 | O | $CH_3$ | $C(CH_3)_2OH$ | A | $CH_3$ |
| 39 | H | $C_6H_5$ | 1 | O | $CH_3$ | $C(CH_3)_2OH$ | A | $CH_3$ |
| 40 | F | $CH_3$ | 1 | O | $CH_3$ | $C(CH_3)_2OH$ | A | $CH_3$ |
| 41 | F | Cl | 1 | O | $CH_3$ | $C(CH_3)_2OH$ | A | $CH_3$ |
| 42 | F | $nC_3H_7$ | 1 | O | $CH_3$ | $C(CH_3)_2OH$ | A | $CH_3$ |
| 43 | F | $iC_3H_7$ | 1 | O | $CH_3$ | $C(CH_3)_2OH$ | A | $CH_3$ |
| 44 | F | $nC_4H_9$ | 1 | O | $CH_3$ | $C(CH_3)_2OH$ | A | $CH_3$ |
| 45 | F | $CH_3$ | 1 | O | $CH_3$ | $C(CH_3)_2OH$ | A | $NH_2$ |
| 46 | F | $C_2H_5$ | 1 | O | $CH_3$ | $C(CH_3)_2OH$ | A | $NH_2$ |
| 47 | F | Cl | 1 | O | $CH_3$ | $C(CH_3)_2OH$ | A | $NH_2$ |
| 48 | F | $CH_3$ | 1 | O | $CH_3$ | $C(CH_3)_2OH$ | B | — |
| 49 | F | $iC_3H_7$ | 1 | O | $CH_3$ | $C(CH_3)_2OH$ | B | — |
| 50 | F | Cl | 1 | O | $CH_3$ | $C(CH_3)_2OH$ | B | — |
| 51 | F | $CH_3$ | 1 | O | $CH_3$ | $C(CH_3)_2OH$ | C | Cl |
| 52 | F | $iC_3H_7$ | 1 | O | $CH_3$ | $C(CH_3)_2OH$ | C | Cl |
| 53 | F | Cl | 1 | O | $CH_3$ | $C(CH_3)_2OH$ | C | Cl |
| 54 | F | $CH_3$ | 1 | O | $CH_3$ | $C(CH_3)_2OH$ | C | Br |
| 55 | F | $iC_3H_7$ | 1 | O | $CH_3$ | $C(CH_3)_2OH$ | C | Br |
| 56 | F | Cl | 1 | O | $CH_3$ | $C(CH_3)_2OH$ | C | Br |
| 57 | F | $CH_3$ | 1 | O | $CH_3$ | $C(CH_3)_2OH$ | D | — |
| 58 | F | $C_2H_5$ | 1 | O | $CH_3$ | $C(CH_3)_2OH$ | D | — |
| 59 | F | Cl | 1 | O | $CH_3$ | $C(CH_3)_2OH$ | D | — |
| 60 | F | $CH_3$ | 1 | O | $CH_3$ | $C(CH_3)_2OH$ | E | — |
| 61 | F | $C_2H_5$ | 1 | O | $CH_3$ | $C(CH_3)_2OH$ | E | — |
| 62 | F | Cl | 1 | O | $CH_3$ | $C(CH_3)_2OH$ | E | — |
| 63 | F | $CH_3$ | 1 | O | $CH_3$ | $C(CH_3)_2OH$ | F | — |
| 64 | F | $C_2H_5$ | 1 | O | $CH_3$ | $C(CH_3)_2OH$ | F | — |
| 65 | F | Cl | 1 | O | $CH_3$ | $C(CH_3)_2OH$ | F | — |
| 66 | F | $CH_3$ | 1 | O | $CH_3$ | $C(CH_3)_2OH$ | G | — |
| 67 | F | Cl | 1 | O | $CH_3$ | $C(CH_3)_2OH$ | G | — |
| 68 | F | $CH_3$ | 1 | O | $CH_3$ | $C(CH_3)_2OH$ | H | — |
| 69 | F | $C_2H_5$ | 1 | O | $CH_3$ | $C(CH_3)_2OH$ | H | — |
| 70 | F | Cl | 1 | O | $CH_3$ | $C(CH_3)_2OH$ | H | — |
| 71 | H | $C_2H_5$ | 1 | O | H | $CH_2OH$ | A | $CH_3$ |
| 72 | H | $C_2H_5$ | 1 | O | $CH_3$ | $CH(CH_3)OH$ | A | $CH_3$ |
| 73 | H | $C_2H_5$ | 1 | O | H | $CH_2OCH_3$ | A | $CH_3$ |
| 74 | H | $C_2H_5$ | 1 | O | H | $CH_2OCOCH_3$ | A | $CH_3$ |
| 75 | H | $C_2H_5$ | 1 | O | H | $CH_2OCO_2CH_3$ | A | $CH_3$ |
| 76 | H | $C_2H_5$ | 1 | O | $CH_3$ | $CH(CH_3)OCOCH_3$ | A | $CH_3$ |
| 77 | H | $C_2H_5$ | 1 | O | $CH_3$ | $C(CH_3)_2OCOCH_3$ | A | $CH_3$ |
| 78 | H | $C_2H_5$ | 1 | O | $CH_3$ | $C(CH_3)_2OSi(CH_3)_2CH(CH_3)_2$ | A | $CH_3$ |
| 79 | F | $C_2H_5$ | 1 | O | H | $CH_2OH$ | A | $CH_3$ |
| 80 | F | $C_2H_5$ | 1 | O | H | $CH(CH_3)OH$ | A | $CH_3$ |
| 81 | F | $C_2H_5$ | 1 | O | H | $CH_2OCH_3$ | A | $CH_3$ |
| 82 | F | $C_2H_5$ | 1 | O | H | $CH_2OCOCH_3$ | A | $CH_3$ |
| 83 | F | $C_2H_5$ | 1 | O | $CH_3$ | $C(CH_3)_2OCOCH_3$ | A | $CH_3$ |
| 84 | F | $C_2H_5$ | 1 | O | H | $CH_2OH$ | A | $NH_2$ |
| 85 | F | $C_2H_5$ | 1 | O | H | $CH_2OCH_3$ | A | $NH_2$ |
| 86 | F | $C_2H_5$ | 1 | O | H | $CH_2OH$ | B | — |
| 87 | F | $C_2H_5$ | 1 | O | H | $CH_2OCH_3$ | B | — |
| 88 | F | $C_2H_5$ | 1 | O | H | $CH_2OH$ | C | Cl |
| 89 | F | $C_2H_5$ | 1 | O | H | $CH_2OCH_3$ | C | Cl |
| 90 | F | $C_2H_5$ | 1 | O | H | $CH_2OH$ | C | Br |
| 91 | F | $C_2H_5$ | 1 | O | H | $CH_2OCH_3$ | C | Br |
| 92 | F | $C_2H_5$ | 1 | O | H | $CH_2OH$ | D | — |
| 93 | F | $C_2H_5$ | 1 | O | H | $CH_2OH$ | E | — |
| 94 | F | $C_2H_5$ | 1 | O | H | $CH_2OH$ | F | — |
| 95 | F | $C_2H_5$ | 1 | O | H | $CH_2OH$ | G | — |
| 96 | F | $C_2H_5$ | 1 | O | H | $CH_2OH$ | H | — |
| 97 | F | $CH_3$ | 0 | — | H | $CH_2OCH_3$ | A | $CH_3$ |
| 98 | F | $CH_3$ | 0 | — | H | $CH_2OCH_3$ | A | $NH_2$ |
| 99 | F | $CH_3$ | 0 | — | H | $CH_2OCH_3$ | B | — |
| 100 | F | $CH_3$ | 0 | — | H | $CH_2OCH_3$ | C | Cl |
| 101 | F | $CH_3$ | 0 | — | H | $CH_2OCH_3$ | C | Br |
| 102 | F | $CH_3$ | 0 | — | H | $CH_2OCH_3$ | D | — |
| 103 | F | $CH_3$ | 0 | — | H | $CH_2OCH_3$ | E | — |
| 104 | F | $CH_3$ | 0 | — | H | $CH_2OCH_3$ | F | — |
| 105 | F | $CH_3$ | 0 | — | H | $CH_2OCH_3$ | G | — |
| 106 | F | $CH_3$ | 0 | — | H | $CH_2OCH_3$ | H | — |
| 107 | F | $CH_3$ | 1 | $CH_2$ | Cl | $CH_2OCH_3$ | A | $CH_3$ |
| 108 | F | $C_2H_5$ | 1 | $CH_2$ | H | $CH_2OCH_3$ | A | $CH_3$ |

TABLE 1-continued

Herbicidal Benzyloxyphenyl-substituted Heterocycles

| | | | | | | | | |
|---|---|---|---|---|---|---|---|---|
| 109 | F | Cl | 1 | $CH_2$ | $CH_3$ | $CH_2OCH_3$ | A | $CH_3$ |
| 110 | F | Br | 1 | $CH_2$ | Cl | $CH_2OCH_3$ | A | $CH_3$ |
| 111 | F | $C_2H_5$ | 1 | $CH_2$ | H | $CH_2OCH_3$ | A | $NH_2$ |
| 112 | H | $C_2H_5$ | 1 | $CH_2$ | H | $CH_2OCH_3$ | A | $NH_2$ |
| 113 | F | $CH_3$ | 1 | $CH_2$ | H | $CH_2OCH_3$ | A | $NH_2$ |
| 114 | F | Cl | 1 | $CH_2$ | H | $CH_2OCH_3$ | A | $NH_2$ |
| 115 | F | $CH_3$ | 1 | $CH_2$ | H | $CH_2OCH_3$ | B | — |
| 116 | F | $CH_3$ | 1 | $CH_2$ | H | $CH_2OCH_3$ | C | Br |
| 117 | F | $CH_3$ | 1 | $CH_2$ | H | $CH_2OCH_3$ | D | — |
| 118 | F | $CH_3$ | 1 | $CH_2$ | H | $CH_2OCH_3$ | E | — |
| 119 | F | $CH_3$ | 1 | $CH_2$ | H | $CH_2OCH_3$ | F | — |
| 120 | F | $CH_3$ | 1 | $CH_2$ | H | $CH_2OCH_3$ | G | — |
| 121 | F | $CH_3$ | 1 | $CH_2$ | H | $CH_2OCH_3$ | H | — |
| 122 | F | $CH_3$ | 1 | O | $CH_3$ | $CH(OCH_3)_2$ | A | $CH_3$ |
| 123 | F | $CH_3$ | 1 | O | $CH_3$ | $CH(OC_2H_5)_2$ | A | $NH_2$ |
| 124 | H | $C_2H_5$ | 1 | O | $CH_3$ | C≡N | A | $CH_3$ |
| 125 | H | $C_2H_5$ | 1 | O | $CH_3$ | C≡N | C | Cl |
| 126 | F | $CH_3$ | 1 | O | $CH_3$ | C≡N | A | $NH_2$ |
| 127 | F | $CH_3$ | 1 | O | $CH_3$ | $CH{=}NOCH_3$ | A | $CH_3$ |
| 128 | F | $CH_3$ | 1 | O | $CH_3$ | $CH{=}NOCH_3$ | A | $NH_2$ |
| 129 | H | $C_2H_5$ | 1 | O | H | 1,3-dioxan-4-yl | A | $CH_3$ |
| 130 | H | $C_2H_5$ | 1 | O | H | 2,2-dimethyl-1,3-dioxolan-4-yl | A | $CH_3$ |
| 131 | H | $C_2H_5$ | 1 | O | H | $C(CH_3)_2OH$ | A | $CH_3$ |
| 132 | F | $C_2H_5$ | 1 | O | H | $C(CH_3)_2OCOCH_3$ | A | $CH_3$ |
| 133 | H | $C_2H_5$ | 1 | O | H | $CH_2OSi(CH_3)_2C(CH_3)_3$ | A | $CH_3$ |
| 134 | H | $C_2H_5$ | 1 | O | H | $C(CH_3)_2OCOCH_3$ | A | $CH_3$ |
| 135 | F | $C_2H_5$ | 1 | O | H | $C(CH_3)_2OH$ | C | Cl |
| 136 | F | $C_2H_5$ | 1 | O | H | $C(CH_3)_2OCOCH_3$ | C | Cl |
| 137 | F | $C_2H_5$ | 1 | O | H | $C(CH_3)_2OH$ | B | — |
| 138 | F | $C_2H_5$ | 1 | O | H | $C(CH_3)_2OCOCH_3$ | B | — |
| 139 | F | $C_2H_5$ | 1 | O | H | CHO | A | $CH_3$ |
| 140 | F | $C_2H_5$ | 1 | O | H | CHO | A | $NH_2$ |
| 141 | F | $C_2H_5$ | 1 | $CH_2$ | H | $C(CH_3)_2OH$ | A | $CH_3$ |
| 142 | F | $CH_3$ | 1 | $CH_2$ | Cl | $C(CH_3)_2OH$ | A | $CH_3$ |
| 143 | F | $CH_3$ | 1 | $CH_2$ | Cl | $CH(CH_3)OH$ | A | $CH_3$ |
| 144 | F | Cl | 1 | $CH_2$ | Br | $CH(CH_3)OCOCH_3$ | A | $CH_3$ |
| 145 | H | $C_2H_5$ | 1 | S | $CH_3$ | $C(CH_3)_2OH$ | A | $CH_3$ |
| 146 | F | $C_2H_5$ | 1 | S | $CH_3$ | $C(CH_3)_2OH$ | A | $CH_3$ |
| 147 | H | $C_2H_5$ | 1 | O | H | $CH_2OCONHCH_3$ | A | $CH_3$ |
| 148 | F | $CH_3$ | 1 | O | $CH_3$ | $CH_2OCONHCH_3$ | A | $CH_3$ |
| 149 | F | $C_2H_5$ | 1 | O | $CH_3$ | $CH_2OCONHØ$ | A | $CH_3$ |
| 150 | F | $C_2H_5$ | 1 | O | $CH_3$ | $CH_2OCONHC_2H_5$ | A | $CH_3$ |
| 151 | F | $C_2H_5$ | 1 | O | $CH_3$ | $CH_2OCOPNHCH(CH_3)_2$ | A | $CH_3$ |
| 152 | F | $C_2H_5$ | 1 | O | H | O | A | $CH_3$ |
| 153 | H | $C_2H_5$ | 1 | $CH_2$ | $CH_3$ | $CO_2CH_3$ | A | $NH_2$ |
| 154 | F | $C_2H_5$ | 1 | $CH_2$ | $CH_3$ | $CO_2CH_3$ | A | $NH_2$ |
| 155 | H | $CH_3$ | 1 | $CH_2$ | $CH_3$ | $CO_2CH_3$ | A | $CH_3$ |
| 156 | F | $CH_3$ | 1 | $CH_2$ | $CH_3$ | $CO_2CH_3$ | A | $CH_3$ |
| 157 | H | $CH_3$ | 1 | $CH_2$ | Cl | $CO_2CH_3$ | A | $CH_3$ |
| 158 | F | $C_2H_5$ | 1 | $CH_2$ | Cl | $CO_2CH_3$ | A | $CH_3$ |
| 159 | F | Cl | 1 | $CH_2$ | Cl | C≡N | A | $CH_3$ |
| 160 | F | $CH_3$ | 1 | $CH_2$ | Cl | C≡N | A | $CH_3$ |
| 161 | F | $CH_3$ | 1 | O | $CH_3$ | $CH_2NHSO_2CH_3$ | A | $CH_3$ |
| 162 | F | $CH_3$ | 1 | O | $CH_3$ | $CH_2NHCOCH_3$ | A | $CH_3$ |
| 163 | F | $CH_3$ | 1 | O | $CH_3$ | $CH_2NHCO_2CH_3$ | A | $CH_3$ |
| 164 | F | $C_2H_5$ | 1 | S | $CH_3$ | $C(CH_3)_2OH$ | A | $CH_3$ |
| 165 | F | $C_2H_5$ | 1 | S | H | $C(CH_3)_2OH$ | A | $NH_3$ |
| 166 | H | $C_2H_5$ | 1 | S | $CH_3$ | $CH_2OH$ | A | $CH_3$ |
| 167 | H | $C_2H_5$ | 1 | S | $CH_3$ | 1,3-dioxan-4-yl | A | $CH_3$ |
| 168 | H | $C_2H_5$ | 1 | S | $CH_3$ | 1,3-dioxan-4-yl | A | $NH_2$ |

TABLE 1-continued

Herbicidal Benzyloxyphenyl-substituted Heterocycles

| | | | | | | | | |
|---|---|---|---|---|---|---|---|---|
| 169 | F | $OCH_3$ | 1 | O | $CH_3$ | $CH_2OH$ | A | $CH_3$ |
| 170 | F | $OC_6H_5$ | 1 | O | $CH_3$ | $CH_2OH$ | A | $CH_3$ |
| 171 | F | $OC_6H_5$ | 1 | O | $CH_3$ | $CH_2OH$ | A | $NH_2$ |
| 172 | F | $C_6H_5$ | 1 | O | $CH_3$ | $CH_2OH$ | A | $CH_3$ |
| 173 | F | $CF_3$ | 1 | O | $CH_3$ | $CH_2OH$ | A | $CH_3$ |
| 174 | H | $CF_3$ | 1 | O | $CH_3$ | $CH_2OH$ | A | $CH_3$ |
| 175 | H | $C_6H_5$ | 1 | O | $CH_3$ | $CH_2OH$ | A | $CH_3$ |
| 176 | H | $OC_6H_5$ | 1 | O | $CH_3$ | $CH_2OH$ | A | $CH_3$ |
| 177 | H | $OCH_3$ | 1 | O | $CH_3$ | $CH_2OH$ | A | $CH_3$ |
| 178 | H | $OC_2H_5$ | 1 | O | $CH_3$ | $CH_2OH$ | A | $CH_3$ |
| 179 | H | $CH{=}CH_2$ | 1 | O | $CH_3$ | $CH_2OH$ | A | $CH_3$ |
| 180 | H | $C_2H_5$ | 1 | O | H | $C(CH_3)_2OH$ | J | — |
| 181 | F | $C_2H_5$ | 1 | O | H | $CH_2OH$ | J | — |

I

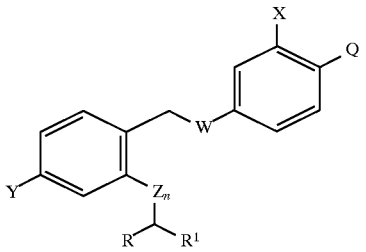

where W and Z are oxygen, X is hydrogen, Y is ethyl, n is 1, R is methyl, $R^1$ is $C(CH_3)_2OH$, and Q is moiety A

| Cmpd. No. | $R^2$ |
|---|---|
| 182 | H |
| 183 | $NH_2$ |
| 184 | $C_2H_5$ |
| 185 | $C_3H_7$ |
| 186 | $CH(CH_3)_2$ |
| 187 | $C_3H_6F$ |
| 188 | $CHF_2$ |
| 189 | $CH_2CN$ |
| 190 | $CH_2CO_2C_2H_5$ |
| 191 | $CH_2CH{=}CH_2$ |
| 192 | $CH_2C{\equiv}CH$ |
| 193 | Na |
| 193 | $CH_2C_6H_5$ |
| 194 | $CH_2OCH_3$ |

I

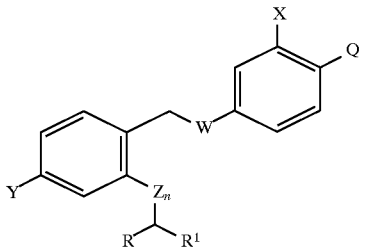

where W is sulfur

| Cmpd No. | X | Y | n | Z | R | $R^1$ | Q | $R^2$ or $R^3$ |
|---|---|---|---|---|---|---|---|---|
| 196 | H | $CH_3$ | 1 | O | $CH_3$ | $C(CH_3)_2OH$ | A | $CH_3$ |
| 197 | H | Cl | 1 | O | $CH_3$ | $C(CH_3)_2OH$ | F | — |
| 198 | H | $C_2H_5$ | 1 | O | $CH_3$ | $C(CH_3)_2OH$ | A | $CH_3$ |
| 199 | H | $C_2H_5$ | 1 | O | $CH_3$ | $C(CH_3)_2OH$ | A | $NH_2$ |

-continued

| Cmpd No. | X | Y | n | Z | R | $R^1$ | Q | $R^2$ or $R^3$ |
|---|---|---|---|---|---|---|---|---|
| 200 | H | $C_2H_5$ | 1 | $CH_2$ | $CH_3$ | $C(CH_3)_2OH$ | B | — |
| 201 | H | $C_2H_5$ | 1 | $CH_2$ | H | $C(CH_3)_2OH$ | C | Cl |
| 202 | F | $CH_3$ | 1 | O | $CH_3$ | $CH_2OH$ | A | $CH_3$ |
| 203 | F | Cl | 1 | O | $CH_3$ | $CH_2OCH_3$ | A | $NH_2$ |
| 204 | F | $C_2H_5$ | 1 | O | $CH_3$ | $C(CH_3)_2OH$ | A | $CH_3$ |

TABLE 2

Characterizing Data

| Cmpd No | MP (C.°) Physical State | Cmpd No | MP (C.°) Physical State |
|---|---|---|---|
| 1 | 51–55 | 129 | 118–121 |
| 2 | OIL | 130 | 88–90 |
| 3 | OIL | 131 | GUMMY OIL |
| 4 | LIQUID | 132 | OIL |
| 5 | 45–52 | 133 | OIL |
| 6 | OIL | 134 | 110–112 |
| 71 | OIL | 135 | OIL |
| 73 | 109–110.5 | 136 | OIL |
| 83 | OIL | 137 | OIL |
| 124 | 109–111 | 138 | OIL |
| 125 | OIL | 147 | 148–152 |

Biological Testing

The benzyloxyphenyl-substituted heterocycles of this invention were tested for pre- and postemergence herbicidal activity using a variety of crops and weeds. The test plants included soybean (*Glycine max* var. Winchester), field corn (*Zea mays* var. Pioneer 3732), wheat (*Triticum aestivum* var. Lew), morningglory (*Ipomea lacunosa* or *Ipomea hederacea*), velvetleaf (*Abutilon theophrasti*), green foxtail (*Setaria viridis*), Johnsongrass (*Sorghum halepense*), blackgrass (*Aloepecurus myosuroides*), common chickweed (*Stellaria media*), and common cocklebur (*Xanthium strumarium* L.).

For preemergence testing, two disposable fiber flats (8 cm×15 cm×25 cm) for each rate of application of each candidate herbicide were filled to an approximate depth of 6.5 cm with steam-sterilized sandy loam soil. The soil was leveled and impressed with a template to provide five evenly spaced furrows 13 cm long and 0.5 cm deep in each flat. Seeds of soybean, wheat, corn, green foxtail, and johnsongrass were planted in the furrows of the first flat, and seeds of velvetleaf, morningglory, common chickweed, cocklebur, and blackgrass were planted in the furrows of the second flat. The five-row template was employed to firmly press the seeds into place. A topping soil of equal portions of sand and sandy loam soil was placed uniformly on top of each flat to a depth of approximately 0.5 cm. Flats for postemergence testing were prepared in the same manner except that they were planted 9–14 days prior to the preemergence flats and were placed in a greenhouse and watered, thus allowing the seeds to germinate and the foliage to develop.

In both pre- and postemergence tests, a stock solution of the candidate herbicide was prepared by dissolving 0.27g of the compound in 20 mL of water/acetone (50/50) containing 0.5% v/v sorbitan monolaurate. For an application rate of 3000 g/ha of herbicide a 10 mL portion of the stock solution was diluted with water/acetone (50/50) to 45 mL. The volumes of stock solution and diluent used to prepare solutions for lower application rates are shown in the following table:

| Application Rate (g/ha) | Volume (mL) of Stock Solution | Volume (mL) of Acetone/Water | Total Volume (mL) of Spray Solution |
|---|---|---|---|
| 3000 | 10 | 35 | 45 |
| 1000 | 3 | 42 | 45 |
| 300 | 1 | 44 | 45 |
| 100 | 0.3 | 45 | 45.3 |
| 30 | 0.1 | 45 | 45.1 |
| 10 | 0.03 | 45 | 45.03 |
| 3 | 0.01 | 45 | 45.01 |

The preemergence flats were initially subjected to a light water spray. The four flats were placed two by two along a conveyor belt (i.e., the two preemergence followed by the two postemergence flats). The conveyor belt fed under a spray nozzle mounted about ten inches above the postemergent foliage. The preemergent flats were elevated on the belt so that the soil surface was at the same level below the spray nozzle as the foliage canopy of the postemergent plants. The spray of herbicidal solution was commenced and once stabilized, the flats were passed under the spray at a speed to receive a coverage equivalent of 1000L/ha. At this coverage the application rates are those shown in the above table for the individual herbicidal solutions. The preemergence flats were watered immediately thereafter, placed in the greenhouse and watered regularly at the soil surface. The postemergence flats were immediately placed in the greenhouse and not watered until 24 hours after treatment with the test solution. Thereafter they were regularly watered at ground level. After 12–17 days the plants were examined and the phytotoxicity data were recorded.

Herbicidal activity data at selected application rates are given for various compounds of this invention in Table 1 and Table 2 The test compounds are identified by numbers which correspond to those in Table 1.

Phytotoxicity data were taken as percent control. Percent control was determined by a method similar to the 0 to 100 rating system disclosed in "Research Methods in Weed Science," 2nd ed., B. Truelove, Ed.; Southern Weed Science Society; Auburn University, Auburn, Ala., 1977. The rating system is as follows:

Herbicide Rating System

| Rating Percent Control | Description of Main Categories | Crop Description | Weed Description |
|---|---|---|---|
| 0 | No effect | No crop reduction or injury | No weed control |
| 10 | | Slight discoloration or stunting | Very poor weed control |
| 20 | Slight effect | Some discoloration stunting or stand loss | Poor weed control |
| 30 | | Crop injury more pronounced but not lasting | Poor to deficient weed control |
| 40 | | Moderate injury, crop usually recovers | Deficient weed control |
| 50 | Moderate effect | Crop injury more lasting recovery doubtful | Deficient to moderate weed control |
| 60 | | Lasting crop injury no recovery | Moderate weed control |
| 70 | | Heavy injury and stand loss | Control somewhat less than satisfactory |
| 80 | Severe | Crop nearly destroyed, a few survivors | Satisfactory to good weed control |
| 90 | | Only occasional live plants left | Very good to excellent control |
| 100 | Complete effect | Complete crop destruction | Complete weed destruction |

Formulation

The compounds of this invention were tested in the laboratory as water/acetone (50/50) solutions containing 0.5% v/v sorbitan monolaurate emulsifier. It is expected that all formulations normally employed in applications of herbicides would be usable with the compounds of the present invention. These include wettable powders, emulsifiable concentrates, water suspensions, flowable concentrates, and the like. The pre-and post-emergence activity of selected compounds are shown in Tables 3 and 4.

TABLE 3

PREEMERGENCE HERBICIDAL ACTIVITY (% CONTROL)

| Cmpd No | SOY | WHT | CRN | ABUTH | IPOSS | STEME | XANPE | ALOMY | SETVI | SORHA |
|---|---|---|---|---|---|---|---|---|---|---|
| 1 | 80 | 60 | 90 | 100 | 100 | 100 | 100 | 70 | 100 | 80 |
| 2 | 10 | 25 | 15 | 70 | 60 | 90 | ND | ND | 50 | 10 |
| 3 | 30 | 40 | 30 | 100 | 100 | 100 | 30 | ND | 60 | 20 |
| 4 | 70 | 60 | 40 | 100 | 100 | 100 | 90 | ND | 100 | 60 |
| 5 | 70 | 60 | 75 | 100 | 100 | 100 | ND | ND | 80 | 30 |
| 6 | 80 | 40 | 80 | 100 | 100 | 100 | 95 | ND | 100 | 90 |

TABLE 3-continued

| Cmpd No | SOY | WHT | CRN | ABUTH | IPOSS | STEME | XANPE | ALOMY | SETVI | SORHA |
|---|---|---|---|---|---|---|---|---|---|---|
| | PREEMERGENCE HERBICIDAL ACTIVITY (% CONTROL) | | | | | | | | | |
| 71 | 60 | 50 | 50 | 100 | 100 | 100 | 100 | 85 | 100 | 90 |
| 73 | 60 | 40 | 70 | 100 | 100 | 100 | 90 | 60 | 100 | 65 |
| 83 | 30 | 30 | 40 | 100 | 100 | 100 | 100 | 80 | 100 | 70 |
| 124 | 30 | 30 | 50 | 100 | 100 | 100 | 70 | ND | 80 | 60 |
| 125 | 10 | 30 | 10 | 70 | 70 | 100 | 70 | ND | 70 | 50 |
| 129 | 100 | 40 | 80 | 100 | 100 | 100 | 70 | ND | 100 | 60 |
| 130 | 70 | 40 | 60 | 100 | 100 | 100 | 100 | ND | 80 | 50 |
| 131 | 90 | 50 | 70 | 100 | 100 | 100 | 85 | 65 | 100 | 90 |
| 132 | 60 | 40 | 70 | 100 | 100 | 100 | 80 | 60 | 80 | 50 |
| 133 | 30 | 10 | 50 | 100 | 70 | 100 | 70 | 70 | 70 | 55 |
| 134 | 80 | 40 | 80 | 100 | 70 | 100 | 60 | 50 | 100 | 95 |
| 135 | 40 | 35 | 0 | 100 | 90 | 100 | 65 | 50 | 90 | 20 |
| 136 | 10 | 10 | 20 | 100 | 70 | 100 | 30 | 60 | 50 | 40 |
| 137 | 40 | 30 | 30 | 100 | 100 | 100 | 70 | 60 | 100 | 60 |
| 138 | 40 | 60 | 40 | 100 | 100 | 100 | 50 | 60 | 100 | 75 |
| 147 | 100 | 30 | 60 | 100 | 100 | 100 | 90 | ND | 80 | 80 |

Rate of Application is 0.3 Kg/Ha
SOY is soybean, WHT is wheat, CRN is corn, ABUTH is velvetleaf, IPOSS is morningglory, STEMME is chickweed, XANPE is cocklebur, ALOMY is blackgrass, SETVI is green foxtail, and SORHA is johnsongrass
ND is no data

TABLE 4

| Cmpd No | SOY | WHT | CRN | ABUTH | IPOSS | STEME | XANPE | ALOMY | SETVI | SORHA |
|---|---|---|---|---|---|---|---|---|---|---|
| | POSTEMERGENCE HERBICIDAL ACTIVITY (% CONTROL) | | | | | | | | | |
| 1 | 80 | 60 | 80 | 100 | 100 | 100 | 100 | 50 | 80 | 60 |
| 2 | 70 | 40 | 40 | 100 | 100 | 100 | 70 | 40 | 50 | 30 |
| 3 | 80 | 35 | 80 | 100 | 100 | 100 | 100 | 50 | 90 | 25 |
| 4 | 100 | 60 | 90 | 100 | 100 | 100 | 100 | ND | 100 | 70 |
| 5 | 95 | 50 | 70 | 100 | 100 | 100 | 100 | ND | 70 | 30 |
| 6 | 85 | 70 | 100 | 100 | 100 | ND | 100 | 90 | 100 | 100 |
| 71 | 80 | 50 | 80 | 100 | 100 | ND | 100 | 70 | 100 | 90 |
| 73 | 95 | 40 | 80 | 100 | 100 | 100 | 100 | 50 | 100 | 80 |
| 83 | 70 | 60 | 70 | 100 | 100 | ND | ND | 80 | 100 | 70 |
| 124 | 80 | 35 | 70 | 100 | 100 | 100 | 100 | ND | 80 | 70 |
| 125 | 55 | 30 | 75 | 90 | 100 | 100 | 100 | ND | 90 | 30 |
| 129 | 90 | 30 | 80 | 100 | 100 | 100 | 100 | ND | 100 | 90 |
| 130 | 80 | 20 | 70 | 100 | 100 | 100 | 100 | ND | 100 | 60 |
| 131 | 85 | 65 | 90 | 100 | 100 | ND | 100 | 80 | 80 | 85 |
| 132 | 70 | 30 | 80 | 100 | 100 | 100 | 100 | 40 | 90 | 60 |
| 133 | 90 | 30 | 80 | 100 | 100 | 100 | 90 | 30 | 100 | 60 |
| 134 | 70 | 35 | 90 | 100 | 100 | 100 | 90 | 40 | 100 | 75 |
| 135 | 75 | 50 | 100 | 100 | 100 | ND | 100 | 75 | 90 | 65 |
| 136 | 60 | 40 | 70 | 100 | 100 | 100 | 100 | 60 | 70 | 60 |
| 137 | 85 | 75 | 100 | 100 | 100 | ND | 100 | 90 | 100 | 90 |
| 138 | 70 | 60 | 80 | 100 | 100 | 100 | 100 | 70 | 100 | 100 |
| 147 | 90 | 30 | 90 | 100 | 100 | 100 | 100 | 70 | 90 | 70 |

Herbicidal compositions are prepared by combining herbicidally effective amounts of the active compounds with adjuvants and carriers normally employed in the art for facilitating the dispersion of active ingredients for the particular utility desired, recognizing the fact that the formulation and mode of application of a toxicant may affect the activity of the material in a given application. Thus, for agricultural use the present herbicidal compounds may be formulated as granules of relatively large particle size, as water-soluble or water-dispersible granules, as powdery dusts, wettable powders, as emulsifiable concentrates, as solutions, or as any of several other known types of formulations, depending on the desired mode of application. It is to be understood that the amounts specified in this specification are intended to be approximate only, as if the word "about" were placed in front of the amounts specified.

These herbicidal compositions may be applied either as water-diluted sprays, or dusts, or granules to the areas in which suppression of vegetation is desired. These formulations may contain as little as 0.1%, 0.2% or 0.5% to as much as 95% or more by weight of active ingredient.

Dusts are free flowing admixtures of the active ingredient with finely divided solids such as talc, natural clays, kieselguhr, flours such as walnut shell and cottonseed flours, and other organic and inorganic solids which act as dispersants and carriers for the toxicant; these finely divided solids have an average particle size of less than about 50 microns.

A typical dust formulation useful herein is one containing 1.0 part or less of the herbicidal compound and 99.0 parts of talc.

Wettable powders, also useful formulations for both pre- and post-emergence herbicides, are in the form of finely divided particles which disperse readily in water or other dispersant. The wettable powder is ultimately applied to the soil either as a dry dust or as an emulsion in water or other liquid. Typical carriers for wettable powders include Fuller's earth, kaolin clays, silicas, and other highly absorbent, readily wet inorganic diluents. Wettable powders normally are prepared to contain about 5–80% of active ingredient, depending on the absorbency of the carrier, and usually also contain a small amount of a wetting, dispersing or emulsifying agent to facilitate dispersion. For example, a useful wettable powder formulation contains 80.0 parts of the herbicidal compound, 17.9 parts of Palmetto clay, and 1.0 part of sodium lignosulfonate and 0.3 part of sulfonated aliphatic polyester as wetting agents. Additional wetting agent and/or oil will frequently be added to the tank mix for postemergence application to facilitate dispersion on the foliage and absorption by the plant.

Other useful formulations for herbicidal applications are emulsifiable concentrates (ECs) which are homogeneous liquid compositions dispersible in water or other dispersant, and may consist entirely of the herbicidal compound and a liquid or solid emulsifying agent, or may also contain a liquid carrier, such as xylene, heavy aromatic naphthas, isphorone, or other non-volatile organic solvents. For herbicidal application these concentrates are dispersed in water or other liquid carrier and normally applied as a spray to the area to be treated. The percentage by weight of the essential active ingredient may vary according to the manner in which the composition is to be applied, but in general comprises 0.5 to 95% of active ingredient by weight of the herbicidal composition.

Flowable formulations are similar to ECs except that the active ingredient is suspended in a liquid carrier, generally water. Flowables, like ECs, may include a small amount of a surfactant, and will typically contain active ingredients in the range of 0.5 to 95%, frequently from 10 to 50%, by weight of the composition. For application, flowables may be diluted in water or other liquid vehicle, and are normally applied as a spray to the area to be treated.

Typical wetting, dispersing or emulsifying agents used in agricultural formulations include, but are not limited to, the alkyl and alkylaryl sulfonates and sulfates and their sodium salts; alkylaryl polyether alcohols; sulfated higher alcohols; polyethylene oxides; sulfonated animal and vegetable oils; sulfonated petroleum oils; fatty acid esters of polyhydric alcohols and the ethylene oxide addition products of such esters; and the addition product of long chain mercaptans and ethylene oxide. Many other types of useful surface-active agents are available in commerce. Surface-active agents, when used, normally comprise 1 to 15 % by weight of the composition.

Other useful formulations include suspensions of the active ingredient in a relatively non-volatile solvent such as water, corn oil, kerosene, propylene glycol, or other suitable solvents.

Still other useful formulations for herbicidal applications include simple solutions of the active ingredient in a solvent in which it is completely soluble at the desired concentration, such as acetone, alkylated naphthalenes, xylene, or other organic solvents. Granular formulations, wherein the toxicant is carried on relative coarse particles, are of particular utility for aerial distribution or for penetration of cover crop canopy. Pressurized sprays, typically aerosols wherein the active ingredient is dispersed in finely divided form as a result of vaporization of a low-boiling dispersant solvent carrier, such as the Freon fluorinated hydrocarbons, may also be used. Water-soluble or water-dispersible granules are free-flowing, non-dusty, and readily water-soluble or water-miscible. The soluble or dispersible granular formulations described in U.S. Pat. No. 3,920,442 are useful herein with the present herbicidal compounds. In use by the farmer on the field, the granular formulations, emulsifiable concentrates, flowable concentrates, solutions, etc., may be diluted with water to give a concentration of active ingredient in the range of say 0.1% or 0.2% to 1.5% or 2%.

The herbicidal compounds of this invention may be formulated and/or applied with insecticides, fungicides, nematicides, plant growth regulators, fertilizers, or other agricultural chemicals and may be used as effective soil sterilants as well as selective herbicides in agriculture. In applying an active compound of this invention, whether formulated alone or with other agricultural chemicals, an effective amount and concentration of the active compound is of course employed; the amount may be as low as, e.g. about 1 to 250 g/ha, preferably about 4 to 30 g/ha. For field use, where there are losses of herbicide, higher application rates (e.g., four times the rates mentioned above) may be employed.

The active herbicidal compounds of the present invention may also be used in combination with other herbicides. Therefore, one aspect of this invention relates to an herbicidal composition comprising an herbicidally effective amount of a compound of formula I and an herbicidally effective amount of another herbicide. Such herbicides include, for example: N-(phosphonomethyl)glycine ("glyphosate"); aryloxyalkanoic acids such as (2,4-dichlorophenoxy)acetic acid ("2,4-D"), (4-chloro-2-methylphenoxy)acetic acid ("MCPA"), (+/-)-2-(4chloro-2-methylphenoxy)propanoic acid ("MCPP"); ureas such as N,N-dimethyl-N'-[4-(1-methylethyl)phenyl]urea ("isoproturon"); imidazolinones such as 2-[4,5-dihydro-4-methyl-4-(1-methylethyl)-5-oxo-1H-imidazol-2-yl]-3-pyridinecarboxylic acid ("imazapyr"), a reaction product comprising (+/–)-2-[4,5-dihydro-4-methyl-4-(1-methylethyl)-5-oxo-1H-imidazol-2-yl]-4-methylbenzoic acid and (+/–)2-[4,5-dihydro-4-methyl-4-(1 -methylethyl)-5-oxo-1H-imidazol-2-yl]-5-methylbenzoic acid ("imazamethabenz"), (+/–)-2-[4,5-dihydro-4-methyl4-(1-methylethyl)-5-oxo-1H-imidazol-2-yl]-5-ethyl-3-pyridinecarboxylic acid ("imazethapyr"), and (+/–)-2-[4,5-dihydro-4-methyl-4-(1-methylethyl)-5-oxo-1H-imidazol-2-yl]-3-quinolinecarboxylic acid ("imazaquin"); diphenyl ethers such as 5-[2-chloro-4-(trifluoromethyl)phenoxy]-2-nitrobenzoic acid ("acifluorfen"), methyl 5-(2,4-dichlorophenoxy)-2-nitrobenzoate ("bifenox"), and 5-[2-chloro-4- (trifluoromethyl)phenoxy]-N-(methylsulfonyl)-2-nitrobenzamide ("fomasafen"); hydroxybenzonitriles such as 4-hydroxy-3,5-diiodobenzonitrile ("ioxynil") and 3,5-dibromo-4hydroxybenzonitrile ("bromoxynil"); sulfonylureas such as 2-[[[[(4chloro-6-methoxy-2-pyrimidinyl) amino]carbonyl]amino]sulfonyl]benzoic acid ("chlorimuron"), 2-chloro-N-[ [(4-methoxy-6-methyl-1,3,5-triazin-2-yl)amino]carbonyl]benzenesulfonamide (achlorsulfuron"), 2-[[[[[(4,6-dimethoxy-2-pyrimidinyl) amino]carbonyl]amino]sufonyl]methyl]-benzoic acid ("bensulfuron"), 2-[[[[(4,6-dimethoxy-2-pyrimidinyl) amino]carbonyl]amino]sulfonyl]-1-methy-1H-pyrazol-4-carboxylic acid ("pyrazosulfuron"), 3-[[[[(4-methoxy-6-methyl-1,3,5-triazin-2-yl)amino]carbonyl]amino]sulfonyl]-2-thiophenecarboxylic acid ("thifensulfuron"), and 2-(2-chloroethoxy)-N[[(4-methoxy-6-methyl-1,3,5-triazin-2-yl)amino]carbonyl]benzenesulfonamide ("triasulfuron"); 2-(4-aryloxyphenoxy)alkanoic acids such as (+/−)-2[4-[(6-chloro-2-benzoxazolyl)oxy]phenoxy]propanoic acid ("fenoxaprop"), (+/−)-2-[4[[5-(trifluoromethyl)-2-pyridinyl]oxy]phenoxy]propanoic acid ("fluazifop"), (+/−)-2-[4-(6chloro-2-quinoxalinyl)oxy]phenoxy]propanoic acid ("quizalofop"), and (+/−) -2-[(2,4-dichlorophenoxy)phenoxy]propanoic acid ("diclofop"); benzothiadiazinones such as 3-(1-methylethyl)-1H-2,1,3-benzothiadiazin-4(3H)-one-2,2-dioxide ("bentazone"); 2-chloroacetanilides such as N-(butoxymethyl)-2-chloro-2',6'-diethyacetanilide ("butachlor"); arenecarboxylic acids such as 3,6-dichloro2-methoxybenzoic acid ("dicamba"); and pyridyloxyacetic acids such as [(4-amino-3,5-dichloro-6-fluoro-2-pyridinyl)oxy]acetic acid ("fluroxypyr").

The herbicidal compounds of this invention are also useful as cotton defoliation and potato dessication agents. Such agents aid in the harvesting of the cotton and potato crops.

It is apparent that various modifications may be made in the formulations and application of the compounds of the present invention without departing from the inventive concepts herein, as defined in the claims.

We claim:

1. A compound having the formula

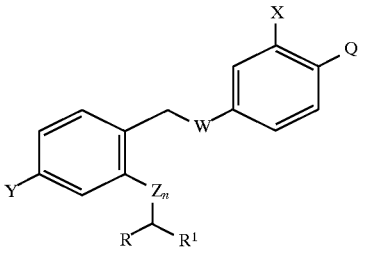

where

Q is

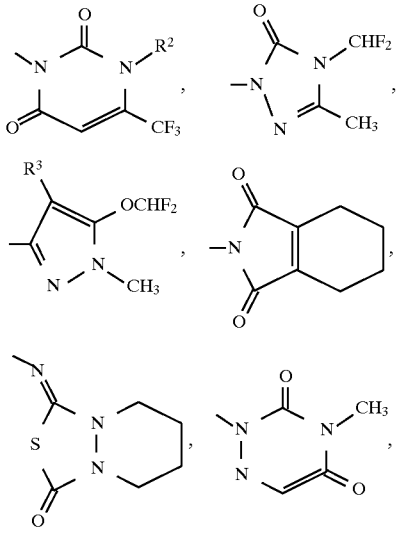

-continued

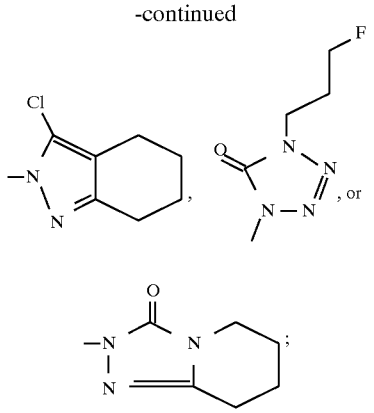

W is oxygen or sulfur;

X is hydrogen, halogen, or lower alkyl;

Y is hydrogen, halogen, straight or branched chain lower alkyl, haloalkyl, alkoxy, alkenyl, phenyl, or phenoxy;

n is 0 or 1;

Z is oxygen, sulfur, or $CH_2$;

R is hydrogen, halogen, or lower alkyl;

$R^1$ is cyano, hydroxyalkyl, alkoxyalkyl, dialkoxyalkyl, trialkylsilyloxyalkyl, formyl, carboxyl, alkylcarbonyl, alkoxycarbonyl, aminocarbonyl, alkylaminocarbonyl, alkylcarbonyloxyalkyl, alkoxycarbonyloxyalkyl, alkylcarbonylaminoalky, alkoxycarbonylaminoalkyl, alkylsulfonylaminoalkyl, alkyaminocarbonyloxyalkyl, arylaminocarbonyloxyalkyl, alkoxyiminoalkyl, epoxy, 1,3-dioxan-4-yl, or 2,2-dialkyl-1,3-dioxolan-4-yl;

$R^2$ is hydrogen, amino, straight or branched chain alkyl, haloalkyl, cyanoalkyl, alkoxyalkyl, arylalkyl, alkoxycarbonylalkyl, alkenyl, alkynyl, or sodium salt; and $R^3$ is halogen; with the proviso that when Z is oxygen and n is 1, $R^1$ is other than alkoxycarbonyl, aminocarbonyl, or alkylcarbonyl.

2. The compound of claim 1 where Q is 1-substituted-6-trifluoromethyl-2,4(1H,3H)-pyrimidinedion-3-yl.

3. The compound of claim 1 where Q is 4-difluoromethyl-4,5-dihydro-3-methyl-1,2,4-triazol-5(1H)-on-1-yl.

4. The compound of claim 1 where Q is 4-halo-5-difluoromethoxy-1-methylpyrazol-3-yl.

5. The compound of claim 1 where Q is 3,4,5,6-tetrahydrophthalimid-1-yl.

6. The compound of claim 1 where Q is 8-thia-1,6-diazabicyclo[4.3.0]-nonane-7-on-9-iminoyl.

7. The compound of claim 1 where Q is 4-methyl-1,2,4-triazine-3,5-dion-2-yl.

8. The compound of claim 1 where Q is 3-chloro-4,5,6,7-tetrahydroindazol-2-yl.

9. The compound of claim 1 where Q is 1,4-dihydro-4-(3-fluoropropyl)-5H-tetrazole-5-on-1-yl.

10. The compound of claim 1 where Q is 5,6,7,8-tetrahydro-1,2,4-triazolo-[4,3-a]pyridin-3(2H)-on-2-yl.

11. The compound of claim 1 where W is oxygen; X is hydrogen or fluoro; Y is methyl or ethyl; n is 1; Z is oxygen; R is methyl; and $R^1$ is hydroxyalkyl or $CH_2OCONHCH_3$.

12. The compound of claim 1 where Q is 1-substituted-6-trifluoromethyl-2,4(1H,3H)-pyrimidinedion-3-yl; W is oxygen; X is hydrogen or fluoro; Y is methyl or ethyl; n is 1; Z is oxygen; R is methyl; $R^1$ is hydroxyalkyl or $CH_2OCONHCH_3$; and $R^2$ is methyl or amino.

13. The compound of claim 12 where $R^1$ is $CH_2OH$, $C(CH_3)_2OH$, or $CH_2OCONHCH_3$.

14. A compound having the formula

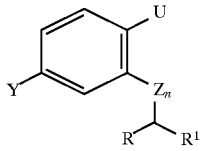

II where

Y is hydrogen, halogen, straight or branched chain lower alkyl, haloalkyl, alkoxy, alkenyl, phenyl, or phenoxy;

U is formyl or $CH_2$-T;

T is chloro, bromo, hydroxy, or 1,1-dimethylethyldimethylsilyloxy;

n is 1;

Z is oxygen;

R is hydrogen, halogen, or lower alkyl; and $R^1$ is cyano, hydroxyalkyl, alkoxyalkyl, alkoxyalkoxyalkyl, alkoxycarbonyl, 1,1-dimethylethyldimethylsilyloxyalkyl, 2,2-dimethyl-1,3-dioxolan-4-yl, or 1,3-dioxan-4-yl;

with the proviso that when Y is methyl, U is formyl, and R is hydrogen, $R^1$ is other than alkoxyalkyl.

15. An herbicidal composition comprising an herbicidally effective amount of a compound of claim 1, and an herbicidally compatible carrier therefor.

16. An herbicidal composition comprising an herbicidally effective amount of a compound of claim 1 and an herbicidally effective amount of another herbicide.

17. The herbicidal composition of claim 16 further comprising an herbicidally compatible carrier therefor.

18. A method of controlling undesired plant growth, comprising application of an herbicidally effective amount of a composition of claim 16 to a locus where the undesired plants are growing or are expected to grow.

19. A method of controlling undesired plant growth, comprising application of an herbicidally effective amount of a composition of claim 17 to the locus where the undesired plants are growing or are expected to grow.

20. A method of controlling undesired plant growth, comprising application of an herbicidally effective amount of a composition of claim 15 to a locus where the undesired plants are growing or are expected to grow.

* * * * *